(12) United States Patent
Dong et al.

(10) Patent No.: US 9,667,167 B2
(45) Date of Patent: May 30, 2017

(54) SYSTEMS AND METHODS FOR POWER CONVERSION WITH DIRECT CURRENT FAULT RIDE-THROUGH CAPABILITY

(71) Applicant: General Electric Company, Schenectady, NY (US)

(72) Inventors: Dong Dong, Schenectady, NY (US); Di Zhang, Niskayuna, NY (US); Andrew Allen Rockhill, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/331,242

(22) Filed: Jul. 15, 2014

(65) Prior Publication Data

US 2016/0020705 A1    Jan. 21, 2016

(51) Int. Cl.
| | |
|---|---|
| *H02M 7/217* | (2006.01) |
| *H02M 1/32* | (2007.01) |
| *H02M 7/487* | (2007.01) |
| *H02M 7/483* | (2007.01) |

(52) U.S. Cl.
CPC ............. *H02M 7/217* (2013.01); *H02M 1/32* (2013.01); *H02M 7/487* (2013.01); *H02M 2007/4835* (2013.01)

(58) Field of Classification Search
CPC ..................... H02M 2007/4835; H02M 7/217; H02M 1/32
See application file for complete search history.

(56) References Cited

U.S. PATENT DOCUMENTS

| | | | | |
|---|---|---|---|---|
| 5,621,634 A | * | 4/1997 | Sato ...................... | H02M 7/487 363/96 |
| 6,480,403 B1 | * | 11/2002 | Bijlenga ............... | H02M 7/487 363/132 |
| 6,697,274 B2 | * | 2/2004 | Bernet .................. | H02M 7/487 363/132 |
| 7,050,311 B2 | | 5/2006 | Lai et al. | |

(Continued)

FOREIGN PATENT DOCUMENTS

| | | |
|---|---|---|
| EP | 2602927 A2 | 6/2013 |
| WO | 9917435 A1 | 4/1999 |
| WO | 2011124260 A1 | 10/2011 |
| WO | 2011157300 A1 | 12/2011 |
| WO | 2012123015 A1 | 9/2012 |

OTHER PUBLICATIONS

Adam et al., "New Flying Capacitor Multilevel Converter", 2011, IEEE, pp. 335-339.*

(Continued)

*Primary Examiner* — Jue Zhang
*Assistant Examiner* — Lakaisha Jackson
(74) *Attorney, Agent, or Firm* — Nitin N. Joshi

(57) ABSTRACT

A power converter including one or more converter legs is provided. Each converter leg includes a first string including a plurality of switches coupled to each other in series. The one or more converter legs also include a second string operatively coupled to the first string at a first node and a second node in a parallel configuration, where the second string includes a plurality of switching units, and where a second string of one converter leg of the one or more converter legs is operatively coupled to second strings corresponding to other converter legs in the one or more converter legs.

19 Claims, 14 Drawing Sheets

(56) References Cited

U.S. PATENT DOCUMENTS

| | | | |
|---|---|---|---|
| 7,206,211 B2* | 4/2007 | Blidberg | H02M 7/487 363/132 |
| 8,385,086 B2 | 2/2013 | Hiller et al. | |
| 9,136,775 B2* | 9/2015 | Takizawa | H02M 7/00 |
| 2011/0115532 A1* | 5/2011 | Roesner | H02M 7/487 327/136 |
| 2012/0120698 A1* | 5/2012 | Viitanen | H02M 7/487 363/126 |
| 2012/0182771 A1 | 7/2012 | Trainer et al. | |
| 2013/0128636 A1 | 5/2013 | Trainer et al. | |
| 2013/0182467 A1 | 7/2013 | Cross et al. | |
| 2014/0092660 A1 | 4/2014 | Zhang et al. | |
| 2014/0139167 A1* | 5/2014 | Steimer | H02M 1/126 318/494 |
| 2015/0016169 A1* | 1/2015 | Honea | H02M 7/5387 363/132 |

OTHER PUBLICATIONS

Soto, et al.,Control of a modular multilevel converter-based HVDC transmission system, Power Electronics and Applications (EPE 2011), Proceedings of the 2011-14th European Conference, 10 Pages, Sep. 2011.

Li et al., "Three-Level Active Neutral-Point-Clamped (ANPC) Converter with Fault Tolerant Ability", Applied Power Electronics Conference and Exposition, APEC, Twenty-Fourth Annual IEEE, Piscataway, NJ, USA, pp. 840-845, Feb. 15, 2009.

European Search Report and Written Opinion issued in connection with corresponding EP Application No. 15176234.1-1809 dated Nov. 25, 2015.

* cited by examiner

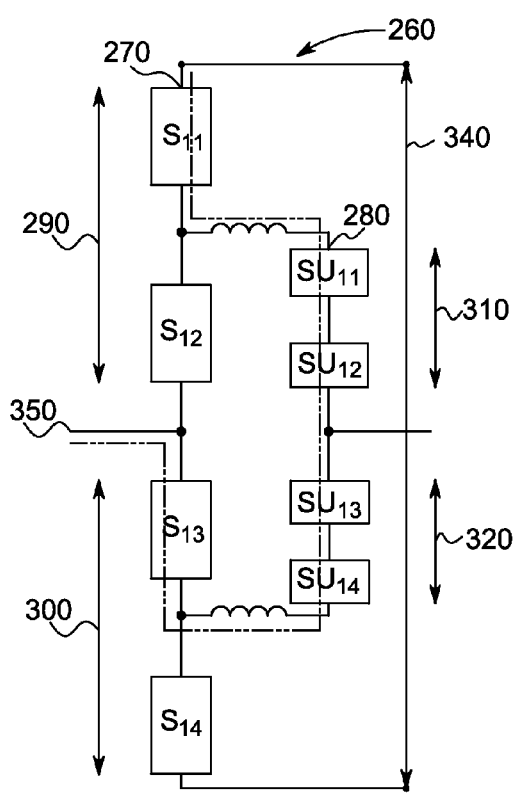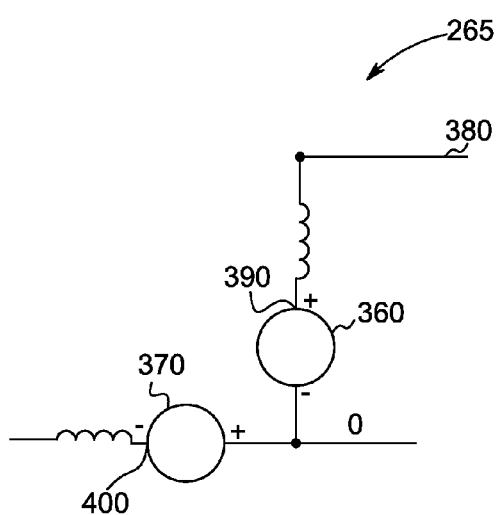
FIG. 3(a)
FIG. 3(b)

SYSTEMS AND METHODS FOR POWER CONVERSION WITH DIRECT CURRENT FAULT RIDE-THROUGH CAPABILITY

BACKGROUND

Embodiments of the present disclosure are related to power conversion systems, and more particularly to multi-level power conversion systems.

There is a growing need to deliver power over long distances to remote locations. Alternating current (AC) transmission systems are considered inefficient for transmitting high voltage power over long distances as the reactance of an AC transmission cable reduces the load carrying capability of the AC cable. High voltage direct current (HVDC) transmission provides a more efficient way to transmit high voltage power over long distances.

Power converters are often used to convert AC power to direct current (DC) power at a transmitting substation and to convert the transmitted DC power back to AC power at a receiving substation in HVDC transmissions. One or more DC fault conditions often occur during operation of the power converters. For example, the DC fault condition may include a DC short circuit. The DC fault conditions induce transient current overshoots on a DC side of the power converter, which in turn may result in a current overshoot on an AC side of the power converter. Components with larger power ratings have been employed in the currently available power converters to overcome such DC faults. However, these components add undesirable costs to the HVDC transmission systems.

Furthermore, in an event of the DC fault, the power converters are configured to shut down and restart their operations once the DC fault is cleared in the HVDC transmission system. Such a temporary suspension of operation leads to a cascading effect in the HVDC transmission system and may result in an HVDC transmission system collapse.

Various approaches have been employed to provide DC fault ride-through capability to the power converters. The DC fault ride-through capability enables the power converters to overcome the DC fault without having to shut down the power converters. Unfortunately, use of the aforementioned approaches call for the use of an increased number of components, higher costs, higher complexity and lower efficiency.

BRIEF DESCRIPTION

In accordance with an aspect of the present disclosure, a power converter including one or more converter legs is provided. Each converter leg includes a first string including a plurality of switches coupled to each other in series. The one or more converter legs also include a second string operatively coupled to the first string at a first node and a second node in a parallel configuration, where the second string includes a plurality of switching units, and where a second string of one converter leg of the one or more converter legs is operatively coupled to second strings corresponding to other converter legs in the one or more converter legs.

In accordance with another aspect of the present disclosure, a method for power conversion is provided. The method includes selectively switching a plurality of switches in at least one converter leg of a power converter. The method also includes independently controlling a plurality of switching units in the at least one converter leg of the power converter. Furthermore, the method includes charging or discharging energy storage elements in the respective switching units. Moreover, the method includes regulating one or more line parameters of the plurality of switching units such that the one or more line parameters attain zero values during a fault condition. The method further includes operating the at least one converter leg by controlling a direct current within the converter leg to provide a direct current fault ride-through capability.

DRAWINGS

These and other features, aspects, and advantages of the present invention will become better understood when the following detailed description is read with reference to the accompanying drawings in which like characters represent like parts throughout the drawings, wherein:

FIG. 2($b$) is a schematic representation of an alternative embodiment of a switching unit for use in the power converter of FIG. 1, according to aspects of the present disclosure;

Figure 1:
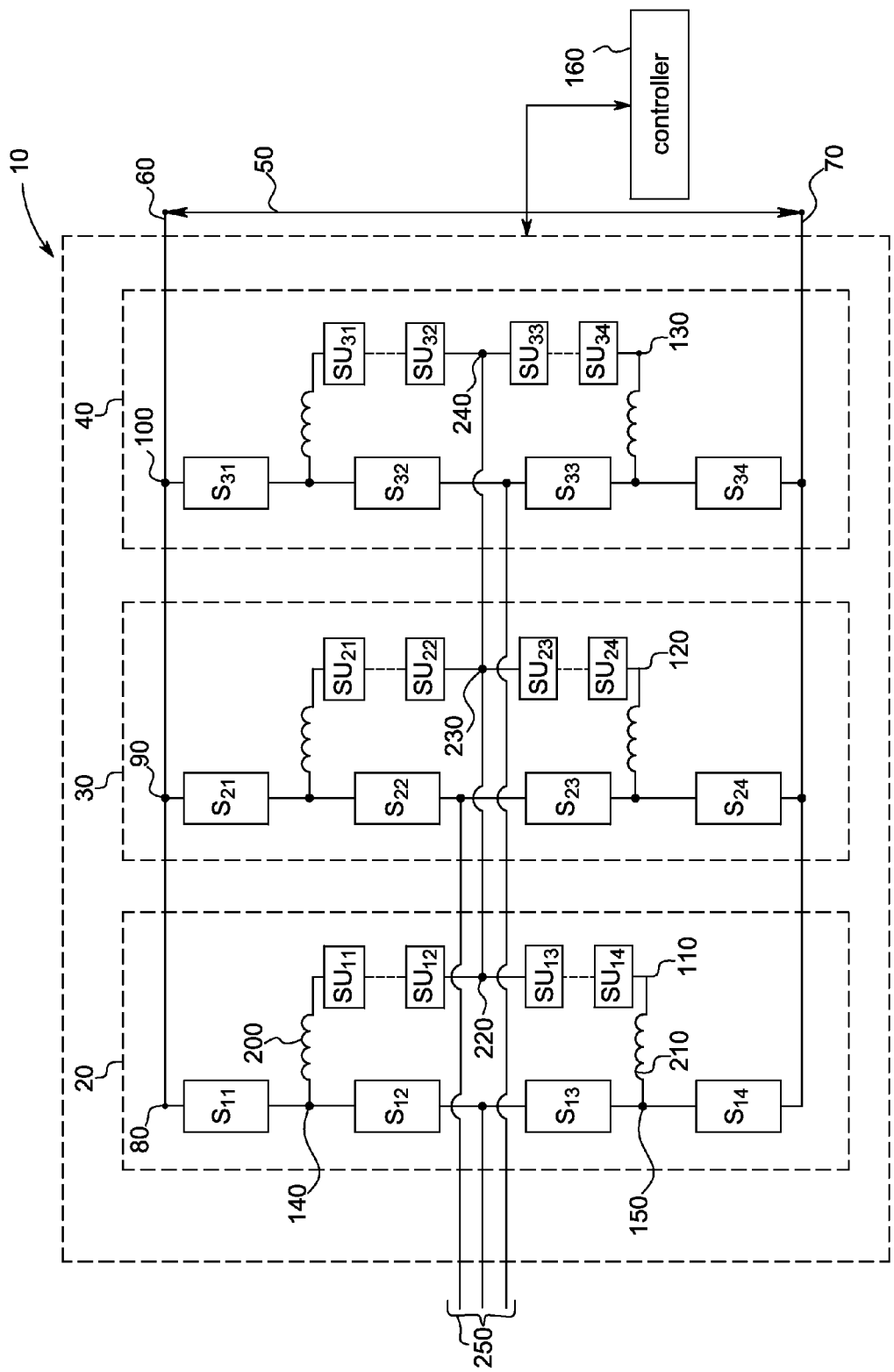
FIG. 1 is a schematic representation of an exemplary power converter configured to provide a direct current fault ride-through capability, according to aspects of the present disclosure.
Figure 5:
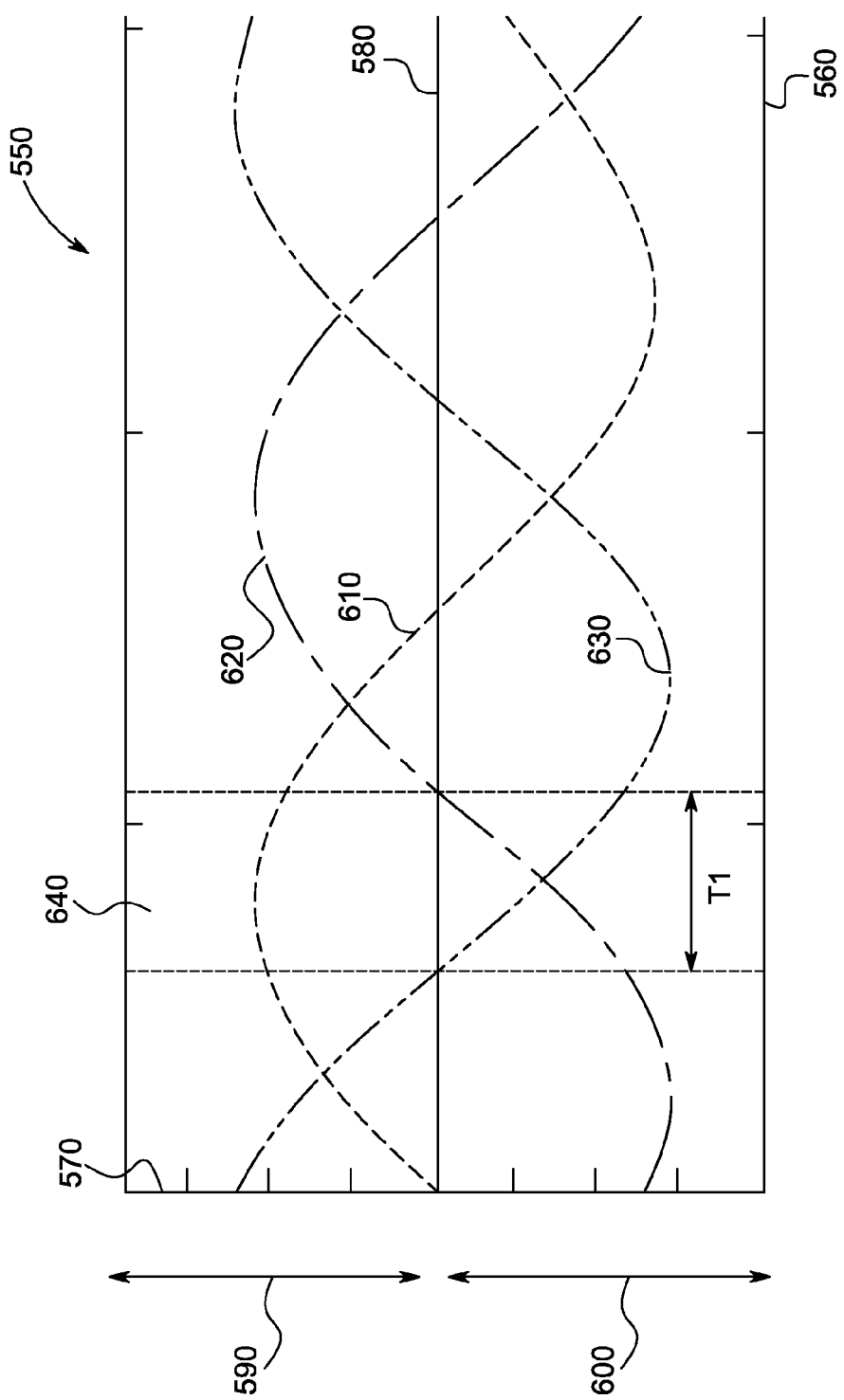
Figure 6:
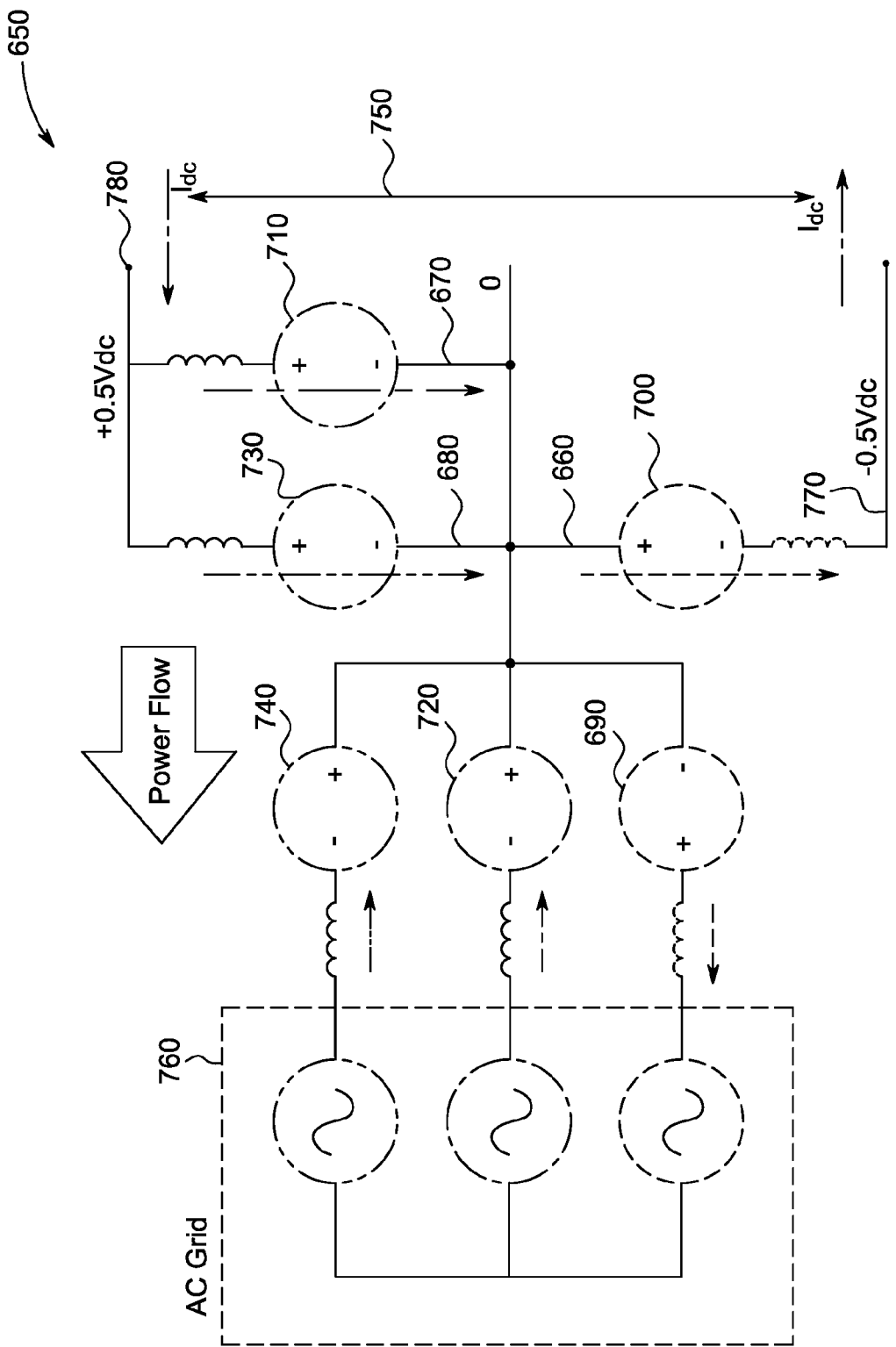
Figure 7:
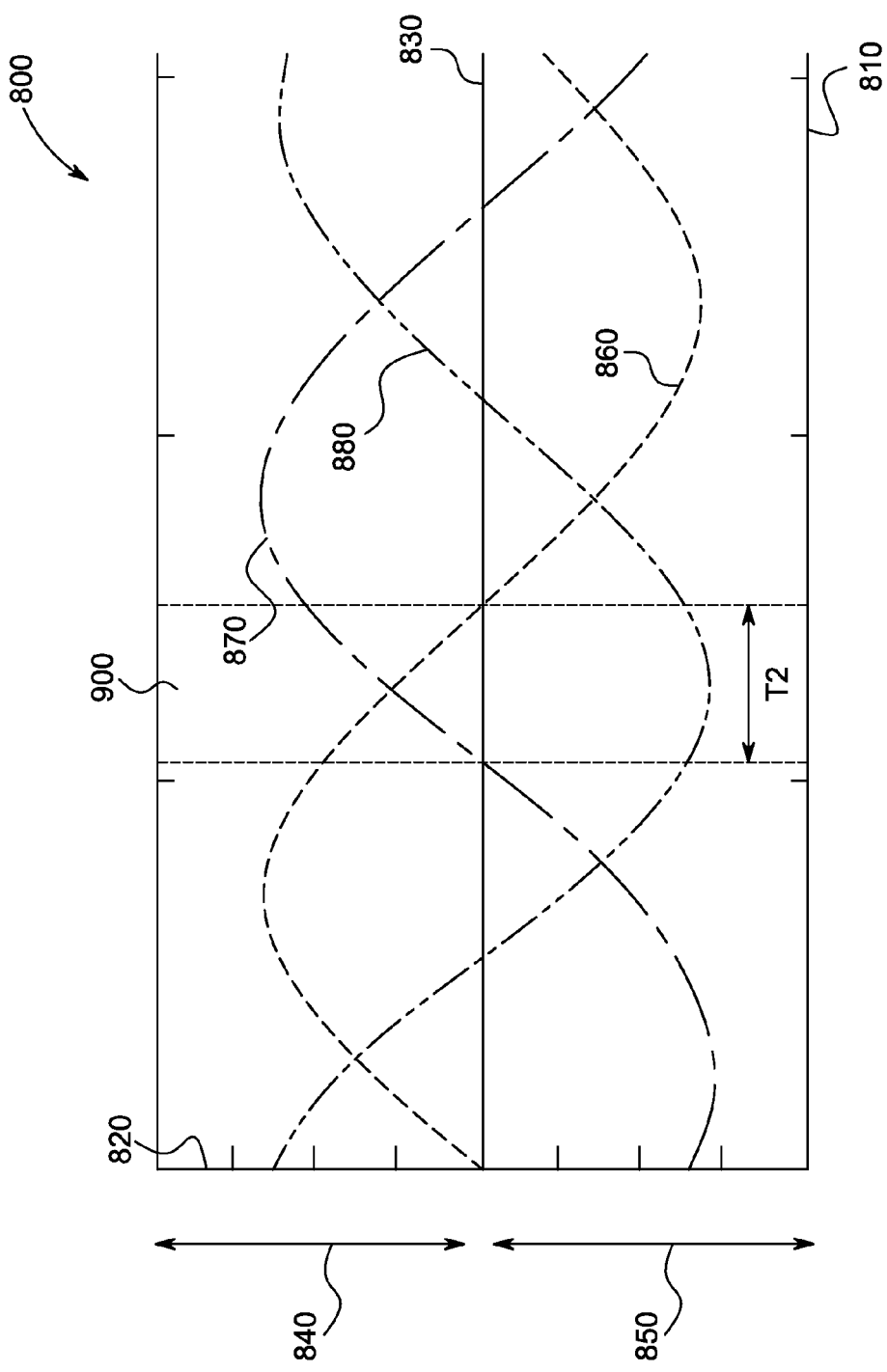
Figure 8:
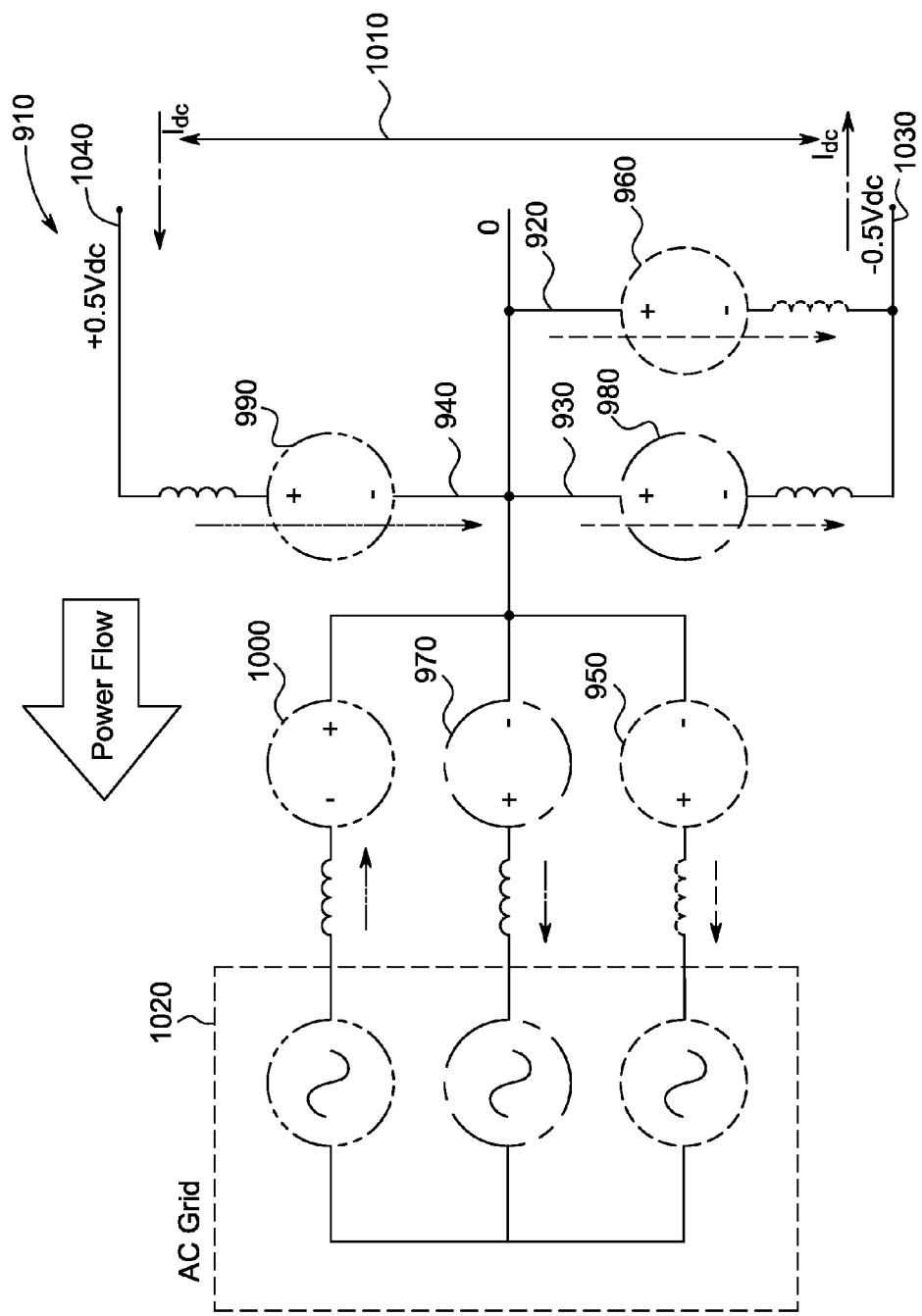
Figure 9:
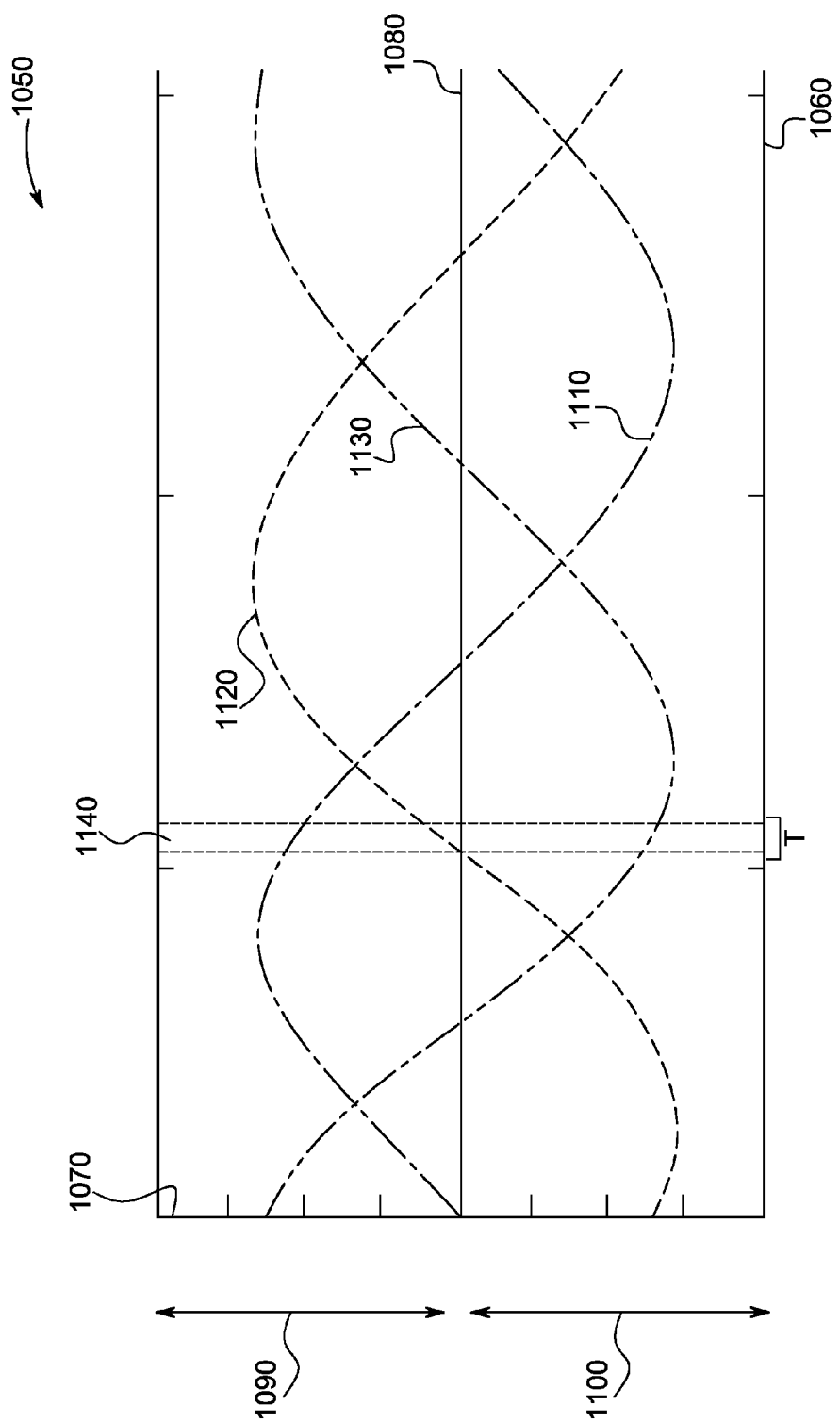
Figure 10:
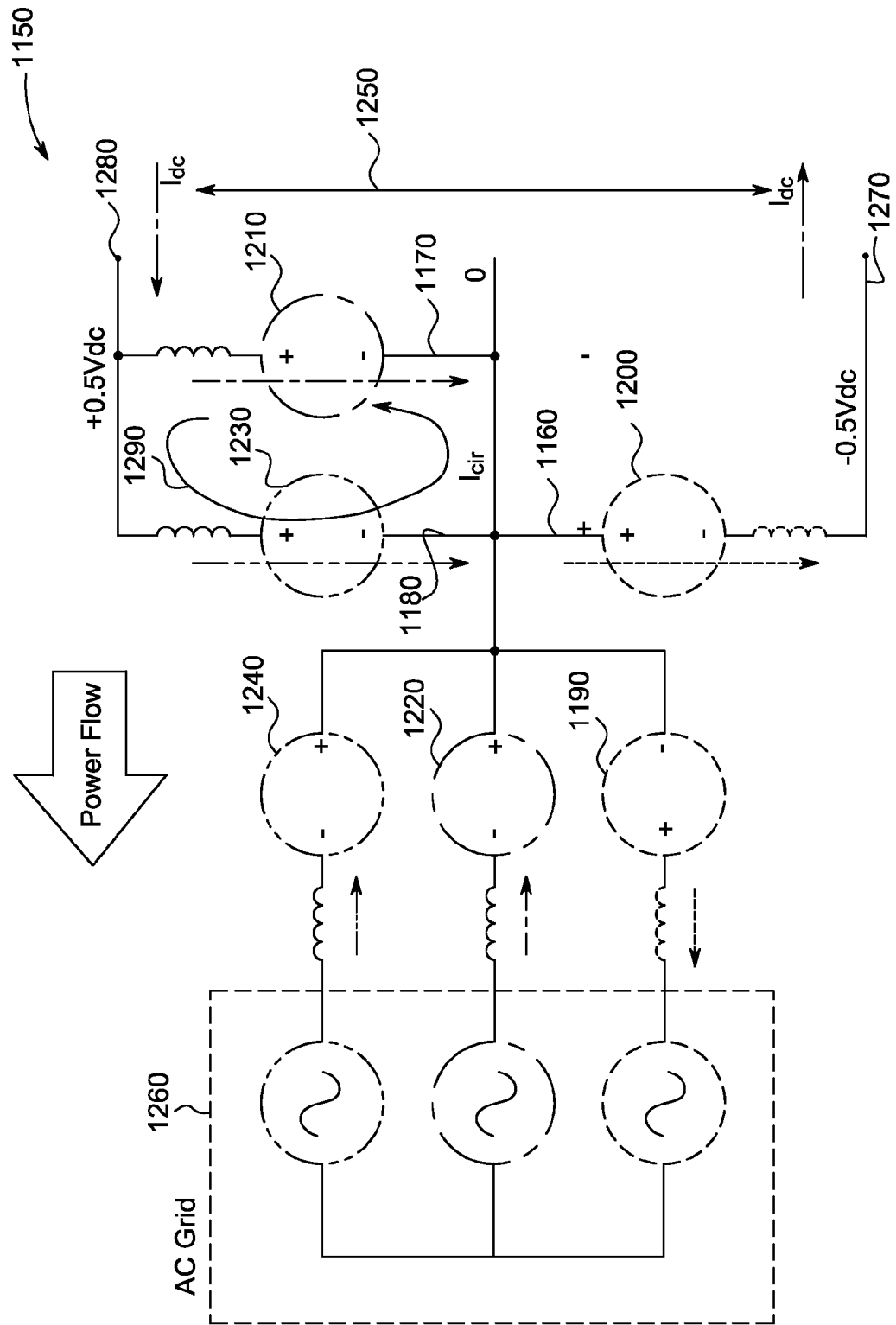
Figure 11:
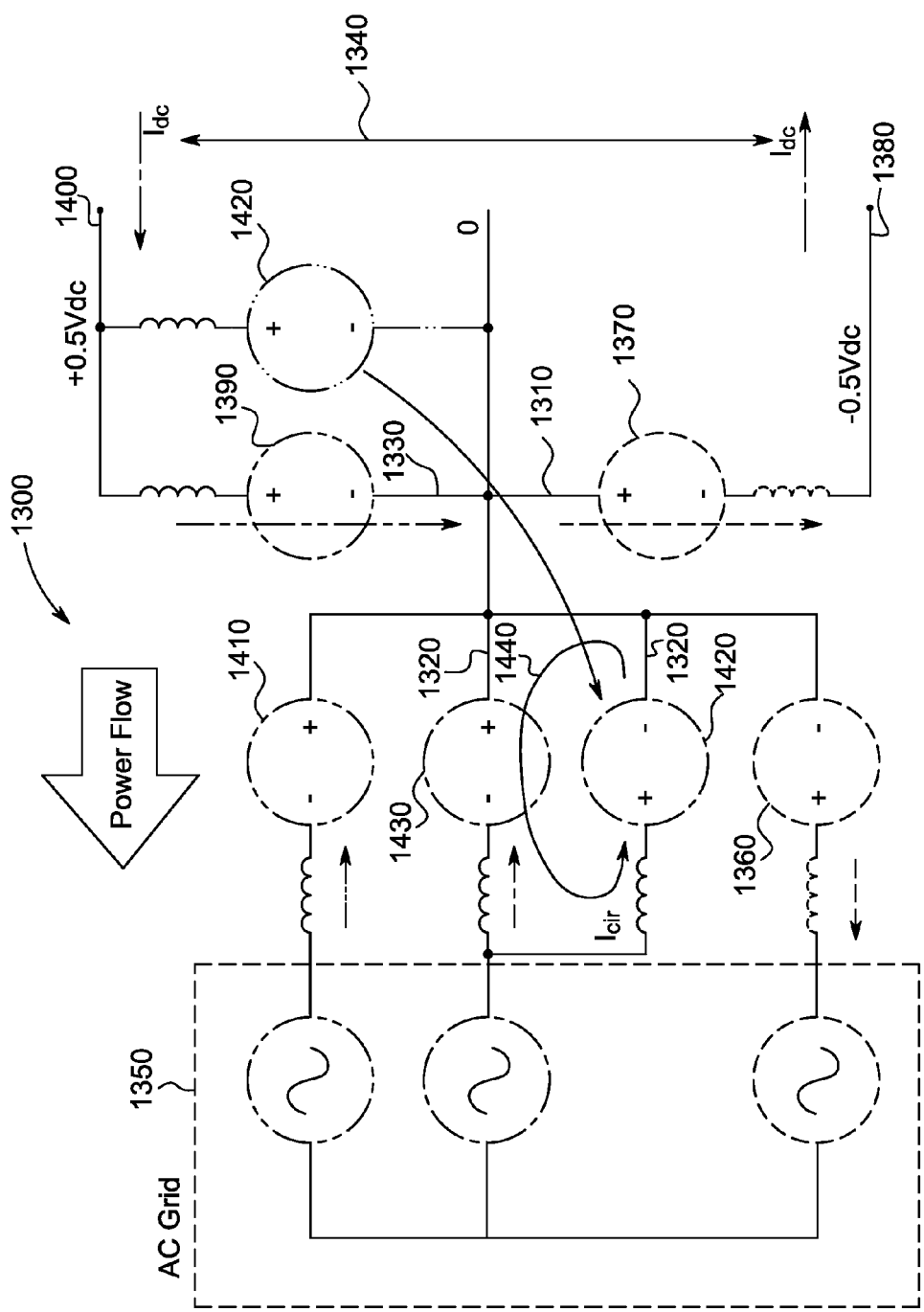
Figure 12:
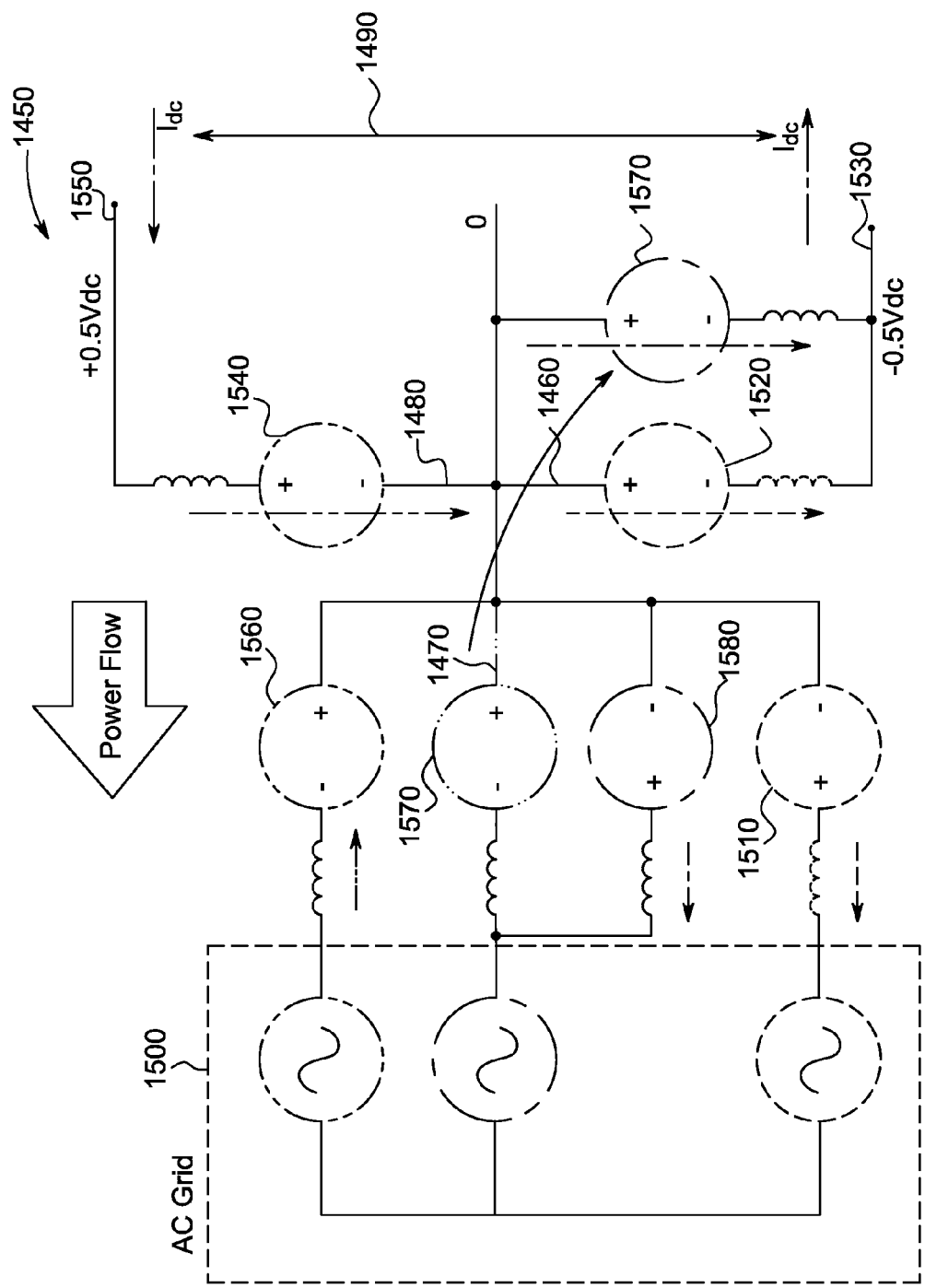
Figure 13:
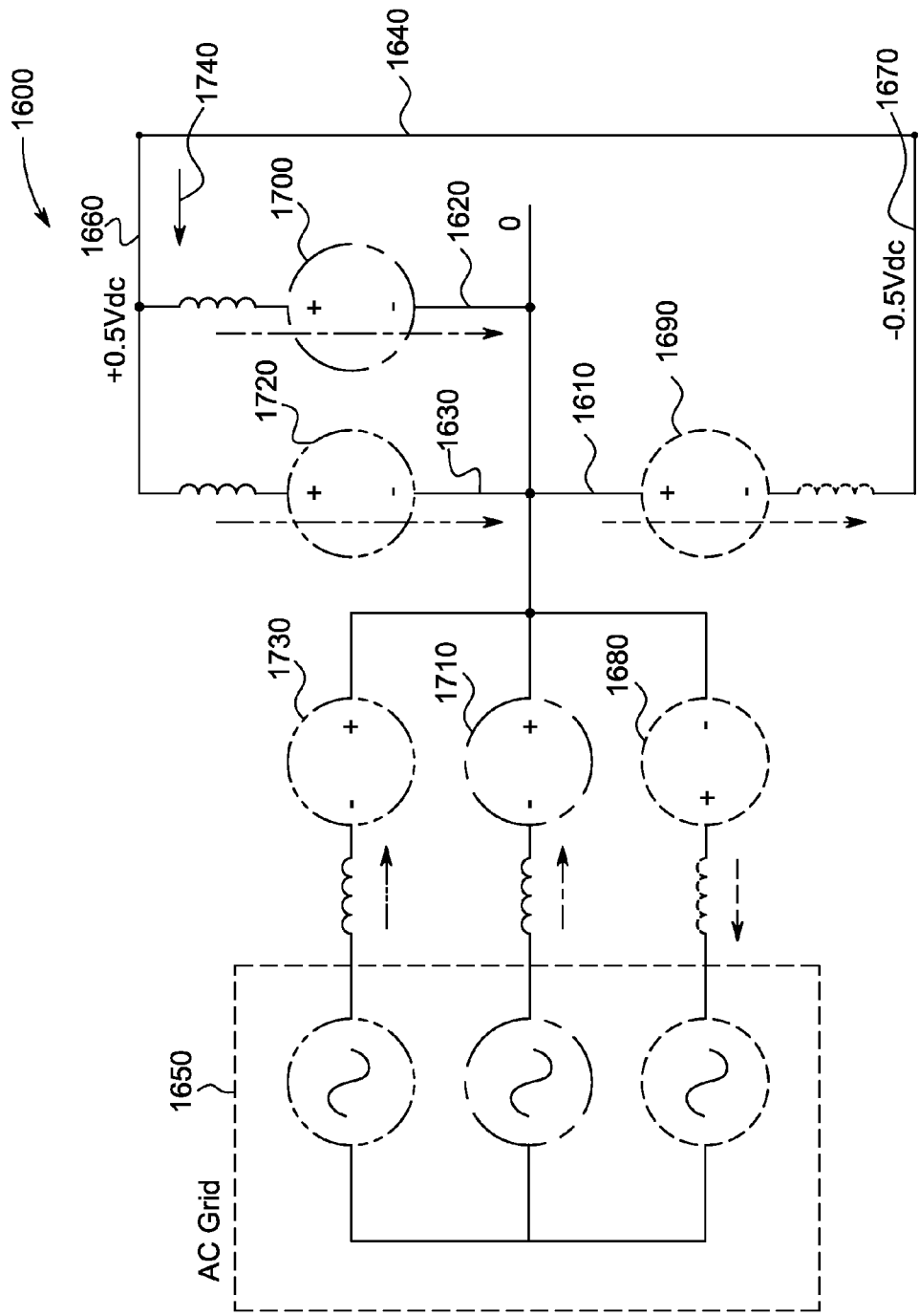
Figure 14:
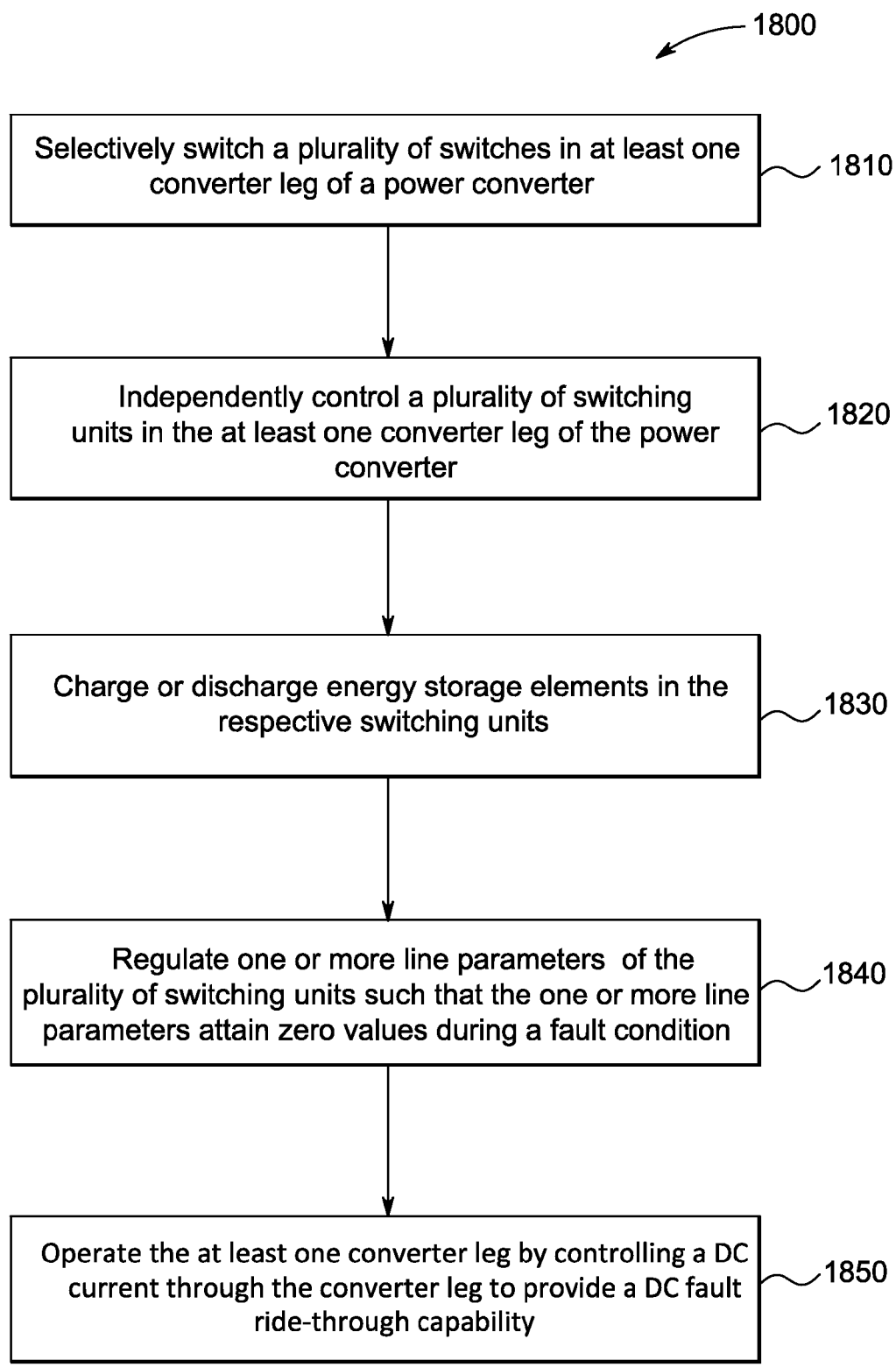

FIGS. 3($a$) and 3($b$) are diagrammatic representations of a circuit representative of a converter leg in a first configuration for use in the power converter of FIG. 1, according to aspects of the present disclosure;

FIGS. 4($a$) and 4($b$) are diagrammatic representations of a circuit representative of a converter leg in a second configuration for use in the power converter of FIG. 1, according to aspects of the present disclosure;

FIG. 5 is a graphical representation of an alternating current cycle depicting positions of three phases during a time interval T1 in the alternating current cycle;

FIG. 6 is a diagrammatic representation of a power converter depicting a configuration of one or more converter legs corresponding to the positions of three phases during the time interval T1 in the alternating current cycle of FIG. 5, according to aspects of the present disclosure;

FIG. 7 is a graphical representation of an alternating current cycle depicting positions of three phases during a time interval T2 in the alternating current cycle;

FIG. 8 is a diagrammatic representation of a power converter depicting a configuration of one or more converter legs corresponding to the positions of three phases during the time interval T2 in the alternating current cycle of FIG. 7, according to aspects of the present disclosure;

FIG. 9 is a graphical representation of an alternating current cycle depicting positions of three phases during a transition time interval T between time intervals T1 and T2;

FIG. 10 is a diagrammatic representation of a power converter depicting a configuration of one or more converter legs in a first stage during the transition time interval T in the alternating current cycle of FIG. 9, according to aspects of the present disclosure;

FIG. 11 is a diagrammatic representation of a power converter depicting a configuration of one or more converter legs in a second stage during the transition time interval T in the alternating current cycle of FIG. 9, according to aspects of the present disclosure;

FIG. 12 is a diagrammatic representation of a power converter depicting a configuration of one or more converter legs in a third stage during the transition time interval T in the alternating current cycle of FIG. 9, according to aspects of the present disclosure;

FIG. 13 is a diagrammatic representation of a power converter depicting a configuration of one or more converter legs during a direct current fault condition, according to aspects of the present disclosure; and FIG. 14 is a flow chart illustrating an exemplary method for power conversion that provides a direct current fault ride-through capability, according to aspects of the present disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

Aspects of the present disclosure are related to exemplary power converters and methods for power conversion that are configured to provide a direct current fault ride-through capability. Use of these power converters and methods aid in operating the power converter during a DC fault condition without having to shut down the power converter. The power converter includes one or more converter legs. Each of the one or more converter legs includes a first string and a second string. The first string includes a plurality of switches coupled to each other in series. The second string is coupled to the first string at a first node and a second node in a parallel configuration. The second string further includes a plurality of switching units. Also, a second string of one converter leg of the one or more converter legs is operatively coupled to second strings corresponding to other converter legs in the one or more converter legs.

FIG. 1 is a schematic representation of a power converter 10 configured to provide a direct current fault ride-through capability, according to aspects of the present disclosure. The direct current fault ride-through capability may be defined as a capability of a power converter to operate during a direct current fault without ceasing the operation of the power converter. In an exemplary embodiment, the power converter 10 may include a three phase power converter. In this embodiment, the three phase power converter may include a first converter leg 20, a second converter leg 30, and a third converter leg 40, where each converter leg corresponds to a phase. In such embodiments, the first converter leg 20, the second converter leg 30, and the third converter leg 40 may be operatively coupled to a direct current (DC) bus 50. The DC bus 50 may include a positive DC terminal 60 and a negative DC terminal 70.

In one embodiment, the first converter leg 20, the second converter leg 30, and the third converter leg 40 may be coupled to each other in a parallel configuration. Each of the converter legs 20, 30, 40 may include a corresponding first string 80, 90, 100 and a corresponding second string 110, 120, 130 respectively. Furthermore, the second string 110 of the first converter leg 20 is operatively coupled to the first string 80 at a first node 140 and a second node 150 in a parallel configuration. Moreover, the first string 80 of the first converter leg 20 may include four switches $S_{11}$, $S_{12}$, $S_{13}$, $S_{14}$ coupled to each other in a series configuration. In one example, the switches $S_{11}$, $S_{12}$, $S_{13}$, $S_{14}$ may include partially controllable semiconductor switches, fully controllable semiconductor switches, or a combination thereof. Additionally, the second string 110 of the first converter leg 20 may include four switching units $SU_{11}$, $SU_{12}$, $SU_{13}$, $SU_{14}$ coupled to each other in a series configuration with each other.

Similarly, the first string 90 of the second converter leg 30 may be coupled to the second string 120 of the second converter leg 30 and the first string 100 of the third converter leg 40 may be coupled to the second string 130 of the third converter leg 40. Moreover, the first string 90 of the second converter leg 30 may include switches $S_{21}$, $S_{22}$, $S_{23}$, $S_{24}$ and the second string 120 of the second converter leg 30 may include switching units $SU_{21}$, $SU_{22}$, $SU_{23}$, $SU_{24}$. Furthermore, the first string 100 of the third converter leg 40 may include switches $S_{31}$, $S_{32}$, $S_{33}$, $S_{34}$ and the second string 130 of the third converter leg 40 may include switching units $SU_{31}$, $SU_{32}$, $SU_{33}$, $SU_{34}$. The aforementioned configuration enables the power converter 10 to convert a three phase alternating current power to a direct current power. The power converter 10 may be coupled to a controller 160. The controller 160 may be used to control the switches of the converter legs 20, 30, 40 to convert the three phase alternating current power to the direct current power.

Figure 2A:
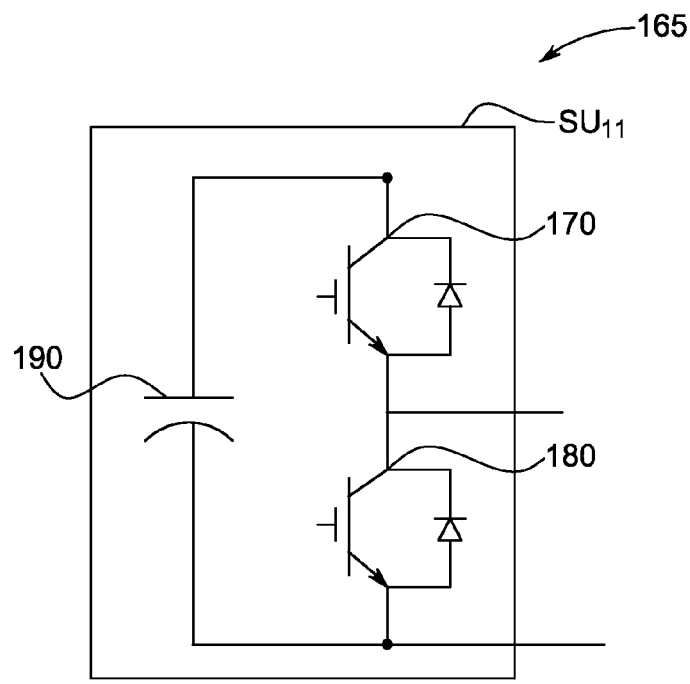
FIG. 2($a$) is a schematic representation of a switching unit for use in the power converter of FIG. 1, according to aspects of the present disclosure.

Referring to FIG. 2(a), a diagrammatic representation 165 of one embodiment of a switching unit, such as the switching unit $SU_{11}$ of FIG. 1 is depicted. In one embodiment, the switching unit $SU_{11}$ may include a plurality of switching elements and an energy storage element. In one example, the embodiment of the switching unit of FIG. 2(a) may be employed in the power converter 10 of FIG. 1. In an exemplary embodiment, the switching unit $SU_{11}$ may include a half bridge converter configuration. This configuration may include two switching elements 170, 180 and one energy storage element 190. In one embodiment, the plurality of switching elements 170, 180 may include an insulated gate bipolar transistor, a metal oxide semiconductor field effect transistor, a field effect transistor, a gate turn-off thyristor, an insulated gate commutated thyristor, an injection enhanced gate transistor, a silicon carbide based switch, a gallium nitride based switch, a gallium arsenide based switch, or combinations thereof. Also, the energy storage element 190 may include a capacitor. In this embodiment, the switching element 170 and the energy storage element 190 are operatively coupled in a series configuration. Furthermore, the switching element 180 may be operatively coupled to the series combination of switching element 170 and energy storage element 190 in a parallel configuration.

Figure 2B:
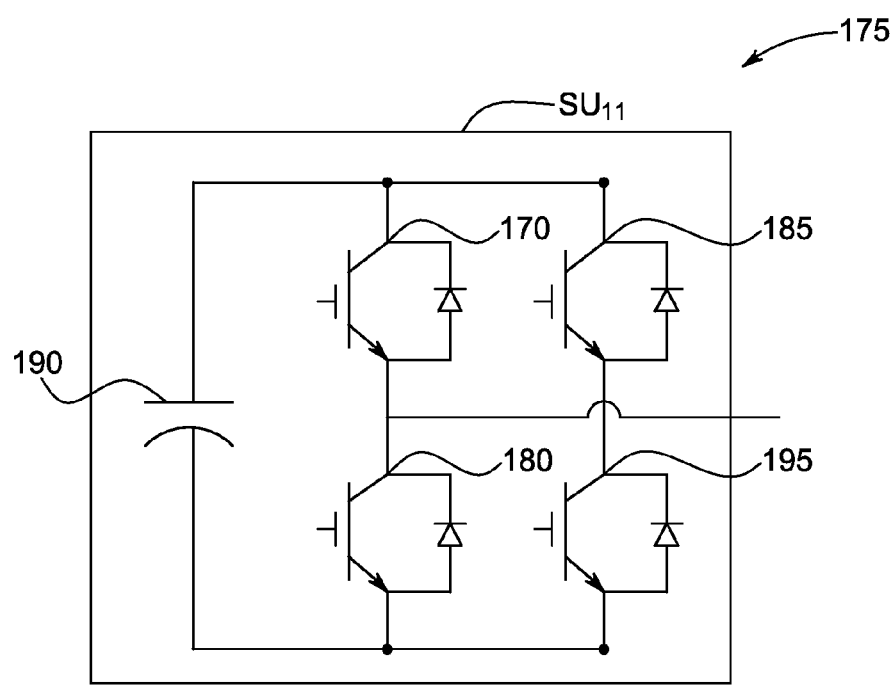

Similarly, FIG. 2(b), depicts an alternative configuration 175 of a switching unit, such as the switching unit $SU_{11}$ of FIG. 1 for use in the power converter 10 of FIG. 1. In an exemplary embodiment, the switching unit $SU_{11}$ may include a full bridge converter configuration. In such a configuration 175, additional switching elements 185 and 195 may be added to the existing configuration 165 shown in FIG. 2(a).

Referring again to FIG. 1, in one embodiment, a first inductor 200 may be operatively coupled to the second string 110 at the first node 140 of the first converter leg 20. Moreover, a second inductor 210 may be operatively coupled to the second string 110 at the second node 150 of the first converter leg 20. Similarly, a plurality of inductors may be operatively coupled to the second converter leg 30 and the third converter leg 40. In another embodiment, the first inductor 200 and the second inductor 210 may be operatively coupled to the second string 110 at a midpoint 220 of the first converter leg 20.

The second string of one converter leg may be operatively coupled to second strings of other converter legs in the power converter. By way of example, the second string 110 of the first converter leg 20 may be operatively coupled to the second string 120 of the second converter leg 30 and the second string 130 of the third converter leg 30. In one example, the second string 110 of the first converter leg 20 may be coupled to the second string 120 of the second converter leg 30 and the second string 130 of the third converter leg 40 at respective midpoints 220, 230, 240 of the second string.

Coupling the second strings as described hereinabove enables the power converter 10 to control an alternating current (AC) side and a direct current (DC) side of the power converter 10 in a decoupled manner. In one example, the AC side may be defined as a side of the power converter 10 in which the switching units of the power converter 10 are operatively coupled to an AC bus 250. Also, the DC side may be defined as a side of the power converter 10 in which the switching units of the power converter 10 are operatively coupled to the DC bus 50. Furthermore, a decoupled control of the AC side and the DC side of the power converter 10 provides independent control of the AC side and the DC side. More specifically, the decoupled control of the AC side and the DC side allows the switching units operatively coupled to the AC side to be controlled independently of the switching units coupled to the DC side of the power converter 10. Such an independent control of the AC side and the DC side provides a DC fault ride-through capability to the power converter 10 during operation. Moreover, the first string 80 of the first converter leg 20, the first string 90 of the second converter leg 30 and the first string 100 of the third converter leg 40 may be operatively coupled to the AC bus 250 to provide alternating current (AC) power to the AC bus 250. In one example, the first string 80 of the first converter leg 20, the first string 90 of the second converter leg 30, and the first string 100 of the third converter leg 40 may be operatively coupled to the AC bus 250 at respective first string nodes of the corresponding converter legs. In one embodiment, the first string nodes may be midpoints of the corresponding converter legs.

In one embodiment, the power converter 10 is a voltage source power converter. Accordingly, in this example, each of the first converter leg 20, the second converter leg 30 and the third converter leg 40 may include a first voltage source and a second voltage source, where each converter leg 20, 30, 40 converts voltage corresponding to a respective phase of the three-phase power converter 10. In accordance with aspects of the present disclosure, the first converter leg 20, the second converter leg 30, and the third converter leg 40 may be arranged in one or more configurations. A first configuration may include a configuration that provides a negative DC voltage from the DC bus 50 to the AC bus 250.

Moreover, a second configuration may include a configuration that provides a positive voltage from the DC bus 50 to the AC bus 250.

FIG. 3(a) is a diagrammatic representation of a converter leg 260, such as the converter leg 20 of FIG. 1, according to aspects of the present disclosure. For ease of illustration, only one converter leg 260 is discussed. The converter leg 260 may include a first string 270 and a second string 280. Moreover, the first string 270 may include a first portion 290 and a second portion 300. Similarly, the second string 280 may include a first portion 310 and a second portion 320. The first portion 290 of the first string 270 may include switches $S_{11}$ and $S_{12}$ and the second portion 300 of the first string 270 may include switches $S_{13}$ and $S_{14}$. Similarly, the first portion 310 of the second string 280 may include switching units $SU_{11}$ and $SU_{12}$. Moreover, the second portion 320 of the second string 280 may include switching units $SU_{13}$ and $SU_{14}$. The converter leg 260 may be configured to provide a negative voltage from a DC bus 340 to an AC bus 350.

The converter leg 260 of FIG. 3(a) may be diagrammatically represented as an arrangement 265 of one or more voltage sources, as depicted in FIG. 3(b). The switching units $SU_{11}$ and $SU_{12}$ may be represented as a first voltage source 360. Also, the switching units $SU_{13}$ and $SU_{14}$ may be represented as a second voltage source 370. Furthermore, switches $S_{11}$ and $S_{13}$ may be switched to a conducting state, thereby operatively coupling a positive DC terminal 380 of the DC bus 340 (see FIG. 3(a)) to the first voltage source 360. More particularly, a positive terminal 390 of the first voltage source 360 may be operatively coupled to the positive DC terminal 380 of the DC bus 340. This arrangement allows charging of the first voltage source 360. In one example, the first voltage source 360 may be charged by storing DC power received from the positive DC terminal 380 of the DC bus 340 in the energy storage elements (see FIG. 2) of the switching units $SU_{11}$ and $SU_{12}$. Furthermore, a negative terminal 400 of the second voltage source 370 may be operatively coupled to an AC bus 350. This configuration allows the second voltage source 370 to discharge through the negative terminal 400 of the second voltage source 370, thereby providing an AC voltage during a negative half cycle of an AC cycle at the AC bus 350. In one embodiment, the second voltage source 370 may be discharged by discharging the energy storage elements in the switching units $SU_{13}$ and $SU_{14}$.

Figures 4A, 4B:
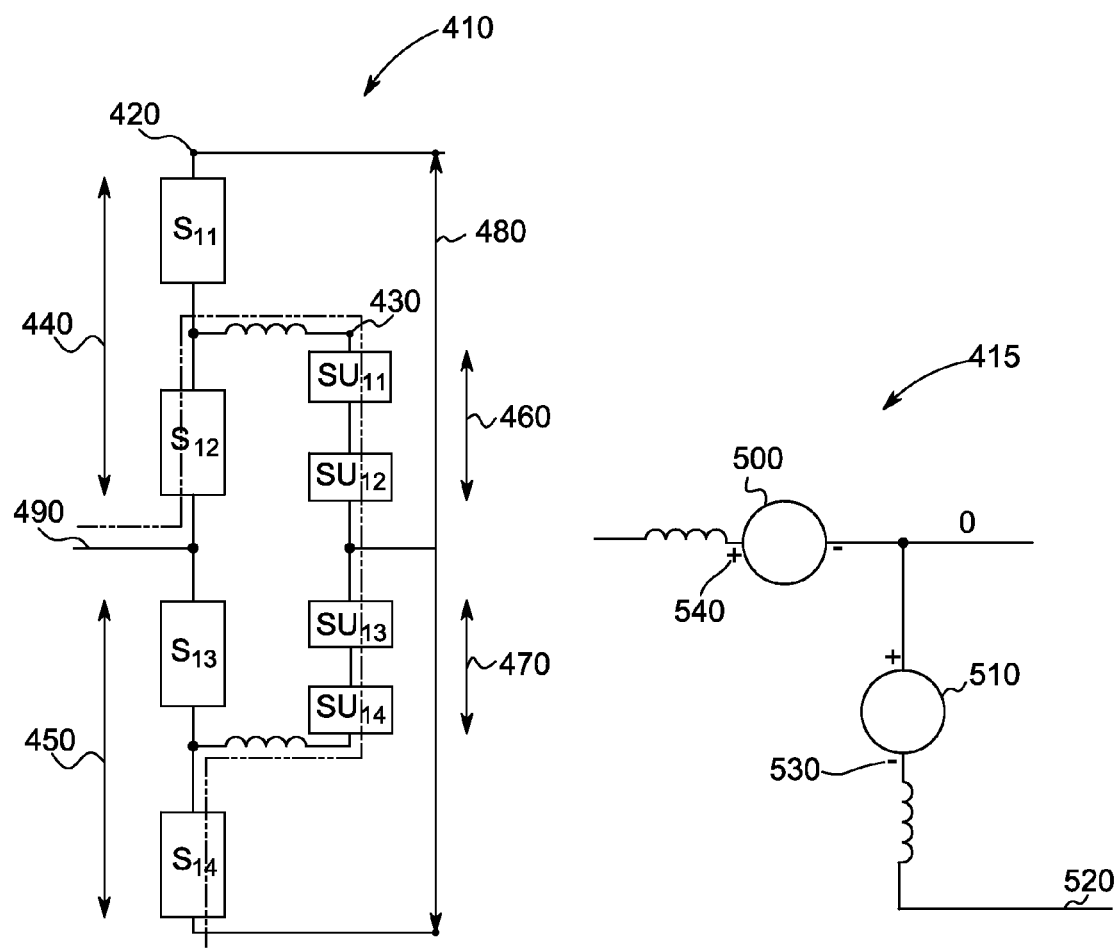

Similarly, FIG. 4(a) is a diagrammatic representation of another embodiment a converter leg 410, such as the converter leg 20 of FIG. 1, according to aspects of the present disclosure. The converter leg 410 may include a first string 420 and a second string 430. Moreover, the first string 420 may include a first portion 440 and a second portion 450. Similarly, the second string 430 may include a first portion 460 and a second portion 470. The first portion 440 of the first string 420 may include switches $S_{11}$ and $S_{12}$ and the second portion 450 of the first string 420 may include switches $S_{13}$ and $S_{14}$. Similarly, the first portion 460 of the second string 430 may include switching units $SU_{11}$ and $SU_{12}$, and the second portion 470 of the second string 430 may include switching units $SU_{13}$ and $SU_{14}$. The converter leg 410 may be configured to provide a positive voltage from a DC bus 480 to an AC bus 490.

The converter leg 410 of FIG. 4(a) may be diagrammatically represented as an arrangement 415 of one or more voltage sources, as depicted in FIG. 4(b). The switching units $SU_{11}$ and $SU_{12}$ may be represented as a first voltage source 500. Also, the switching units $SU_{13}$ and $SU_{14}$ may be represented as a second voltage source 510. Furthermore, switches $S_{12}$ and $S_{14}$ may be turned to a conducting state and switches $S_{11}$ and $S_{13}$ may be switched to a non-conducting state, thereby operatively coupling a negative DC terminal 520 of the DC bus 480 (see FIG. 4(a)) to the second voltage source 510. More particularly, a negative terminal 530 of the second voltage source 510 may be operatively coupled to the negative DC terminal 520 of the DC bus 480. This arrangement allows charging of the second voltage source 510. Furthermore, a positive terminal 540 of the first voltage source 500 may be operatively coupled to the AC bus 490. This configuration allows the first voltage source 500 to discharge through the positive terminal 540 of the second voltage source 510, thereby providing an AC voltage during a positive half cycle of an AC cycle at the AC bus 490. As described with respect to FIGS. 3(a)-3(b) and FIGS. 4(a)-4(b), the first converter leg 20, the second converter leg 30 and the third converter leg 40 in the power converter 10 of FIG. 1 may be configured accordingly to provide a positive voltage and a negative voltage from the DC bus 50 to the AC bus 250 of FIG. 1.

FIG. 5 is a graphical representation 550 of an AC cycle depicting positions of three phases during a time interval T1 in the AC cycle. In one embodiment, a power converter such as the power converter 10 of FIG. 1 may be an AC to DC power converter. The AC to DC power converter converts an AC voltage to a DC voltage based on the AC cycle. In the graphical representation 550 of the AC cycle, the X-axis 560 represents time and the Y-axis 570 represents an amplitude of the AC voltage. Line segment 580 represents a zero voltage condition. Section 590 represents a positive half of the AC cycle 550 and section 600 represents a negative half of the AC cycle 550. Curve 610 represents an AC voltage in a first phase, curve 620 represents the AC voltage in a second phase. Similarly, curve 630 represents the AC voltage in a third phase. Moreover, an AC segment 640 represents a portion of the AC cycle 550 corresponding to the time interval T1. The AC segment 640 depicts a condition where the AC voltage corresponding to the first phase lies within the positive half 590 of the AC cycle 550. Also, the AC voltage corresponding to the second and the third phases lie within the negative half cycle 600 of the AC cycle 550.

FIG. 6 is a diagrammatic representation of a power converter 650 configured to operate in the time interval T1 (see FIG. 5) in the AC cycle 550 (see FIG. 5), according to aspects of the present disclosure. The power converter 650 may include three converter legs for converting a corresponding phase of an AC voltage in the AC cycle 550. By way of example, a first converter leg 660 may be configured to convert the first phase 610 (see FIG. 5) of the AC voltage in the AC cycle 550. Moreover, a second converter leg 670 may be configured to convert the second phase 620 (see FIG. 5) of the AC voltage in the AC cycle 550. Furthermore, a third converter leg 680 may be configured to convert the third phase 630 (see FIG. 5) of the AC voltage in the AC cycle 550. As previously described with respect to FIGS. 3(a)-3(b) and FIGS. 4(a)-4(b), each converter leg may be represented as an arrangement of one or more voltage sources. Accordingly, the first converter leg 660 may be represented as an arrangement of a first voltage source 690 and a second voltage source 700. Moreover, the second converter leg 670 may be represented as an arrangement of a first voltage source 710 and a second voltage source 720. Similarly, the third converter leg 680 may be represented as a first voltage source 730 and a second voltage source 740.

As depicted in FIG. 5, during the AC segment 640 (FIG. 5) the first phase 610 is within the positive half cycle 590 of the AC cycle 550. Also, the second phase 620 and the third phase 630 are within the negative half cycle 600 of the AC cycle 550. Therefore, based on the position of the first phase 610 in the AC segment 640 of FIG. 5, the first converter leg 660 may be configured to provide a positive voltage from a DC bus 750 to an AC bus 760. In such a configuration, the first voltage source 690 of the first converter leg 660 may be operatively coupled to the AC bus 760 and the second voltage source 700 of the first converter leg 660 may be operatively coupled to a negative DC terminal 770 of the DC bus 750. The second voltage source 700 of the first converter leg 660 may be charged by the negative DC terminal 770. Moreover, the first voltage source 690 of the first converter leg 660 may be discharged by providing a positive voltage to the AC bus 760.

Similarly, based on the position of the second phase 620 in the AC segment 640 of FIG. 5, the second converter leg 670 may be configured to provide a negative voltage from the DC bus 750 to the AC bus 760. In such a configuration, the first voltage source 710 of the second converter leg 670 may be operatively coupled to a positive DC terminal 780 and the second voltage source 720 of the second converter leg 670 may be operatively coupled to the AC bus 760. The first voltage source 710 of the second converter leg 670 may be charged from the positive DC terminal 780, while the second voltage source 720 of the second converter leg 670 may be discharged by providing a negative voltage to the AC bus 760.

Furthermore, based on the position of the third phase 630 in the AC segment 640 of FIG. 5, the third converter leg 680 may be configured to provide a negative voltage from the DC bus 750 to the AC bus 760. In this configuration, the first voltage source 730 of the third converter leg 680 may be operatively coupled to the positive DC terminal 780 and the second voltage source 740 of the third converter leg 680 may be operatively coupled to the AC bus 760. The first voltage source 730 of the third converter leg 680 may be charged from the positive DC terminal 780. Also, the second voltage source 740 of the third converter leg 680 may be discharged by providing a negative voltage to the AC bus 760. Therefore, during the time interval T1, the power converter 650 may be configured to convert DC voltages corresponding to time interval T1 to three phase AC voltages by controlling the voltage sources 690, 720 and 740 to generate one segment of a three phase AC voltage in a process for generating a full sinusoidal wave of the AC voltage.

FIG. 7 is a graphical representation 800 of an AC cycle depicting positions of three phases during a time interval T2 in the AC cycle. In one embodiment, a power converter such as a power converter 10 of FIG. 1 may be an AC to DC power converter. The AC to DC power converter converts an AC voltage to a DC voltage based on the AC cycle. In the graphical representation 800 of the AC cycle, the X-axis 810 represents time and the Y-axis 820 represents an amplitude of the AC voltage. Line segment 830 represents a zero voltage condition. Section 840 represents a positive half of the AC cycle 800 and section 850 represents a negative half of the AC cycle 800. Curve 860 represents an AC voltage in a first phase, while curve 870 represents an AC voltage in a second phase. Similarly, curve 880 represents an AC voltage in a third phase. Moreover, a segment 900 represents a portion of the AC cycle 800 corresponding to the time interval T2. The AC segment 900 depicts a condition where the AC voltage corresponding to the first phase and the second phase lies within the positive half 840 of the AC cycle 800. Also, the AC voltage corresponding to the third phase lies within the negative half cycle 850 of the AC cycle 800.

FIG. 8 is a diagrammatic representation of a power converter 910 configured to operate in the time interval T2 (see FIG. 7) in the AC cycle 800 (see FIG. 7), according to aspects of the present disclosure. The power converter 910 may include three converter legs for converting a corresponding phase of an AC voltage in the AC segment 900. By way of example, a first converter leg 920 may be configured to convert the first phase 860 (see FIG. 7) of the AC voltage in the AC segment 900. Moreover, a second converter leg 930 may be configured to convert the second phase 870 (see FIG. 7) of the AC voltage in the AC segment 900. Furthermore, a third converter leg 940 may be configured to convert the third phase 880 (see FIG. 7) of the AC voltage in the AC segment 900. Also, as previously described with respect to FIGS. 3(*a*)-3(*b*) and FIGS. 4(*a*)-4(*b*), each converter leg may be represented as an arrangement of one or more voltage sources. Accordingly, the first converter leg 920 may be represented as an arrangement of a first voltage source 950 and a second voltage source 960. Moreover, the second converter leg 930 may be represented as an arrangement of a first voltage source 970 and a second voltage source 980. Similarly, the third converter leg 940 may be represented as an arrangement of a first voltage source 990 and a second voltage source 1000.

As depicted in FIG. 7, during the AC segment 900 (FIG. 7) the first phase 860 and the second phase 870 are within the positive half cycle 840 of the AC cycle 800. Also, the third phase 880 is within the negative half cycle 850 of the AC cycle 800. Therefore, based on the position of the first phase 860 in the AC segment 900 of FIG. 7, the first converter leg 920 may be configured to provide a positive voltage from a DC bus 1010 to an AC bus 1020. In such a configuration, the first voltage source 950 of the first converter leg 920 may be operatively coupled to the AC bus 1020 and the second voltage source 960 of the first converter leg 920 may be operatively coupled to a negative DC terminal 1030 of the DC bus 1010. The second voltage source 960 of the first converter leg 920 may be charged by the negative DC terminal 1030, while the first voltage source 950 of the first converter leg 920 may be discharged by providing a positive voltage to the AC bus 1020.

Similarly, based on the position of the second phase 870 in the AC segment 900 of FIG. 7, the second converter leg 930 may be configured to provide a positive voltage from the DC bus 1010 to the AC bus 1020. In this configuration, the first voltage source 970 of the second converter leg 930 may be operatively coupled to the AC bus 1020 and the second voltage source 980 of the second converter leg 930 may be operatively coupled to the negative DC terminal 1030. The first voltage source 970 of the second converter leg 930 may be discharged by providing the negative voltage to the AC bus 1020. Also, the second voltage source 980 of the second converter leg 930 may be charged from the negative DC terminal 1030.

Furthermore, based on the position of the third phase 880 in the AC segment 900 of FIG. 7, the third converter leg 940 may be configured to provide a negative voltage from the DC bus 1010 to the AC bus 1020. In this configuration, the first voltage source 990 of the third converter leg 940 may be operatively coupled to a positive DC terminal 1040 of the DC bus 1010 and the second voltage source 1000 of the third converter leg 940 may be operatively coupled to the AC bus 1020. The first voltage source 990 of the third converter leg 940 may be charged from the positive DC terminal 1040.

Also, the second voltage source 1000 of the third converter leg 940 may be discharged by providing the negative voltage to the AC bus 1020. Therefore, during the time interval T2, the power converter 910 may be configured to convert DC voltages corresponding to time interval T2 to three phase AC voltages by controlling voltage sources 950, 970 and 1000 to generate a second segment of a three phase AC voltage in a process for generating a full sinusoidal wave of the AC voltage.

FIG. 9 is a graphical representation 1050 of an AC cycle depicting positions of three phases during a transition time interval T between time interval T1 (see FIG. 5) and time interval T2 (see FIG. 7) in the AC cycle 1050. In the graphical representation 1050 of the AC cycle, the X-axis 1060 represents time and the Y-axis 1070 represents an amplitude of the AC voltage. Line segment 1080 represents a zero voltage condition. Section 1090 represents a positive half of the AC cycle 1050 and section 1100 represents a negative half of the AC cycle 1050. Curve 1110 represents an AC voltage in a first phase. Also, curve 1120 represents an AC voltage in a second phase. Similarly, curve 1130 represents an AC voltage in a third phase. Moreover, a transition segment 1140 represents a portion of the AC cycle 1050 in the transition time interval T between T1 and T2. The transition segment 1140 depicts a transition condition where the AC voltage in the first phase 1110 is within the positive half of the AC cycle 1050 and the AC voltage in the third phase 1130 is within the negative half cycle of the AC cycle 1050. However, the AC voltage of the second phase 1120 is at a zero voltage condition and is transitioning from the negative half cycle 1100 to the positive half cycle 1090.

FIG. 10 is a diagrammatical representation of a power converter 1150 depicting a configuration of a first, a second and a third converter leg 1160, 1170, 1180 in a first stage during the transition time interval T 1140 in the alternating current cycle 1050 of FIG. 9, according to aspects of the present disclosure. The power converter 1150 may include the first, the second and the third converter legs 1160, 1170, 1180 for converting a corresponding phase of an AC voltage in the AC cycle 1050. By way of example, the first converter leg 1160 may be configured to convert the first phase 1110 (see FIG. 9) of the AC voltage in the AC cycle 1050. Moreover, the second converter leg 1170 may be configured to convert the second phase 1120 (see FIG. 9) of the AC voltage in the AC cycle 1050. Furthermore, the third converter leg 1180 may be configured to convert the third phase 1130 (see FIG. 9) of the AC voltage in the AC cycle 1050. As described with respect to FIGS. 3(*a*)-3(*b*) and FIGS. 4(*a*)-4(*b*), each converter leg may be represented as an arrangement of one or more voltage sources. Accordingly, the first converter leg 1160 may be represented as an arrangement of a first voltage source 1190 and a second voltage source 1200. Moreover, the second converter leg 1170 may be represented as an arrangement of a first voltage source 1210 and a second voltage source 1220. Similarly, the third converter leg 1180 may be represented as an arrangement of a first voltage source 1230 and a second voltage source 1240. As noted with respect to FIG. 9, during the transition segment 1140, the first phase 1110 is within the positive half cycle 1090 of the AC cycle 1050. Also, the third phase 1130 is within the negative half cycle 1100 of the AC cycle 1050.

Therefore, based on the position of the first phase 1110 in the transition segment 1140 of FIG. 9, the first converter leg 1160 may be configured to provide a positive voltage from a DC bus 1250 to an AC bus 1260. In such a configuration, the first voltage source 1190 of the first converter leg 1160 may be operatively coupled to the AC bus 1260 and the second voltage source 1200 of the first converter leg 1160 may be operatively coupled to a negative DC terminal 1270 of the DC bus 1250. The second voltage source 1200 of the first converter leg 1160 may be charged by the negative DC terminal 1270, while the first voltage source 1190 of the first converter leg 1160 may be discharged by providing a positive voltage to the AC bus 1260.

Similarly, based on the position of the third phase 1130 in the transition segment 1140 of FIG. 9, the third converter leg 1180 may be configured to provide a negative voltage from the DC bus 1250 to the AC bus 1260. In this configuration, the first voltage source 1230 of the third converter leg 1180 may be operatively coupled to a positive DC terminal 1280 of the DC bus 1280 and the second voltage source 1240 of the third converter leg 1180 may be operatively coupled to the AC bus 1260. The first voltage source 1230 of the third converter leg 1180 may be charged from the positive DC terminal 1280. Also, the second voltage source 1240 of the third converter leg 1180 may be discharged by providing a negative voltage to the AC bus 1260.

Furthermore, during the transition time interval T 1140, the second phase 1120 may be at the zero voltage condition (see FIG. 9) and may be transitioning from the negative half cycle 1100 to the positive half cycle 1090. Therefore, in the first stage of transition, the second converter leg 1170 may be configured to provide a negative voltage from the DC bus 1250 to the AC bus 1260. In such a configuration, the first voltage source 1210 of the second converter leg 1170 may be operatively coupled to the positive DC terminal 1280 and the second voltage source 1220 of the second converter leg 1170 may be operatively coupled to the AC bus 1260. The second voltage source 1220 of the second converter leg 1170 may be discharged by providing a negative voltage to the AC bus 1260.

Moreover, the first voltage source 1210 of the second converter leg 1170 and the first voltage source 1230 of the third converter leg 1180 may be controlled to reduce a direct current flowing through the first voltage source 1210 of the second converter leg 1170 to have a minimum value. Once the direct current in the first voltage source 1210 of the second converter leg 1170 is minimized, the first voltage source 1210 of the second converter leg 1170 may attain a zero current condition. Thereafter, the first voltage source 1210 may be operatively decoupled from the positive DC terminal 1280 of the DC bus 1250.

FIG. 11 is a diagrammatical representation of a power converter 1300 depicting a configuration of a first, second and third converter legs 1310, 1320, 1330 in a second stage of transition during the transition time interval T 1140 in the AC cycle 1050 of FIG. 9, according to aspects of the present disclosure. It may be noted that the power converter 1300 of FIG. 11 is representative of the power converter 1150 of FIG. 10 in the second stage of transition. The power converter 1300 may include the first converter leg 1310 that is substantially similar to the first converter leg 1160 of FIG. 10. Also, a second converter leg 1320 of the power converter 1300 may be substantially similar to the second converter leg 1170 of FIG. 10. Furthermore, the third converter leg 1330 of the power converter 1300 may be substantially similar to the third converter leg 1180 of FIG. 10. As previously discussed with respect to FIG. 10, the first converter leg 1310 may be configured to provide a positive voltage from a DC bus 1340 to an AC bus 1350. In such a configuration, a first voltage source 1360 of the first converter leg 1310 may be operatively coupled to the AC bus 1350 and a second voltage source 1370 of the first converter leg 1310 may be operatively coupled to a negative DC terminal 1380 of the DC bus 1340. The second voltage source 1370 of the first converter leg 1310 may be charged from the negative DC terminal 1380, while the first voltage source 1360 of the first converter leg 1310 may be discharged by providing a positive voltage to the AC bus 1350.

Similarly, the third converter leg 1330 may be configured to provide a negative voltage from the DC bus 1340 to the AC bus 1350. In such a configuration, a first voltage source 1390 of the third converter leg 1330 may be operatively coupled to a positive DC terminal 1400 of the DC bus 1340 and a second voltage source 1410 of the third converter leg 1330 may be operatively coupled to the AC bus 1350. The first voltage source 1390 of the third converter leg 1330 may be charged from the positive DC terminal 1400. Moreover, the second voltage source 1410 of the third converter leg 1330 may be discharged by providing a negative voltage to the AC bus 1350.

Furthermore, during the negative half cycle 1100 (see FIG. 9) of the AC cycle 1050 (see FIG. 9), the second converter leg 1320 may be in a configuration depicted in FIG. 3(b) that provides a negative voltage to the AC bus 1350. However, during the positive half cycle 1090 (see FIG. 9) of the AC cycle 1050, the second converter leg 1320 may be in a configuration depicted in FIG. 4(b) that provides a positive voltage to the AC bus 1350. As previously discussed with respect to FIG. 10, during a first stage of transition, a first voltage source 1420 of the second converter leg 1320 may be decoupled from the positive DC terminal 1400 and a second voltage source 1430 of the second converter leg 1320 may be coupled to the AC bus 1350.

Moreover, during the second stage of transition in the transition time interval T, a switch such as switch $S_{21}$ (see FIG. 1) in the second converter leg 1320 may be switched from a conducting state to a non-conducting state and a switch such as switch $S_{22}$ (see FIG. 1) in the second converter leg 1320 may be switched from a non-conducting state to a conducting state. Such a change in states of the switches $S_{21}$ and $S_{22}$ facilitates coupling the first voltage source 1420 of the second converter leg 1320 to the AC bus 1350. At this instant, the first voltage source 1420 of the second converter leg 1320 and the second voltage source 1430 of the second converter leg 1320 may both be coupled to the AC bus 1350. Moreover, a circulation current 1440 generated in the first voltage source 1420 of the second converter leg 1320 during the first stage of transition of FIG. 10 may continue to flow in the first voltage source 1420. The circulation current 1440 may be minimized by controlling voltages of the first voltage source 1420 of the second converter leg 1320 and the second voltage source 1430 of the second converter leg 1320.

FIG. 12 is a diagrammatical representation of a power converter 1450 depicting a configuration of a first, second and third converter legs 1460, 1470, 1480 in a third stage of transition during the transition time interval T 1140 in the AC cycle 1050 of FIG. 9, according to aspects of the present disclosure. It may be noted that the power converter 1450 of FIG. 12 is representative of the power converter 1150 of FIG. 10 in the third stage of transition. The first converter leg 1460 is substantially similar to the first converter leg 1310 of FIG. 11. Also, the second converter leg 1470 may be substantially similar to the second converter leg 1320 of FIG. 11. Furthermore, the third converter leg 1480 may be substantially similar to the third converter leg 1330 of FIG. 11. As previously discussed with respect to FIG. 11, the first converter leg 1460 may be configured to provide a positive voltage from a DC bus 1490 to an AC bus 1500. In such a configuration, a first voltage source 1510 of the first converter leg 1460 may be operatively coupled to the AC bus 1500 and a second voltage source 1520 of the first converter leg 1460 may be operatively coupled to a negative DC terminal 1530 of the DC bus 1490. The second voltage source 1520 of the first converter leg 1460 may be charged from the negative DC terminal 1530. Moreover, the first voltage source 1510 of the first converter leg 1460 may be discharged by providing a positive voltage to the AC bus 1500.

Similarly, the third converter leg 1480 may be configured to provide a negative voltage from the DC bus 1490 to the AC bus 1500. In such a configuration, a first voltage source 1540 of the third converter leg 1480 may be operatively coupled to a positive DC terminal 1550 of the DC bus 1490 and a second voltage source 1560 of the third converter leg 1480 may be operatively coupled to the AC bus 1500. The first voltage source 1540 of the third converter leg 1480 may be charged from the positive DC terminal 1550, while the second voltage source 1560 of the third converter leg 1480 may be discharged by providing a negative voltage to the AC bus 1500.

Additionally, the second converter leg 1470 may be configured as depicted in FIG. 3(b) to provide a negative voltage to the AC bus 1500 (see FIG. 9). However, it may be desirable to transition the second converter leg 1470 from the configuration depicted in FIG. 3(b) to a configuration depicted in FIG. 4(b) to provide a positive voltage to the AC bus 1500. The change in configuration may correspond to a transition of the second phase 1120 (see FIG. 9) from the negative half cycle to the positive half cycle as discussed with respect to FIGS. 9 and 10. As previously discussed with respect to FIG. 10, during a first stage of transition, a first voltage source 1570 of the second converter leg 1470 may be decoupled from the positive DC terminal 1550 and a second voltage source 1580 of the second converter leg 1470 may be coupled to the AC bus 1500. Moreover, in the second stage of transition as previously noted with respect to FIG. 11, the first voltage source 1570 of the second converter leg 1470 and the second voltage source 1580 of the second converter leg 1470, may both be coupled to the AC bus 1500.

Furthermore, during a third stage of transition, the second voltage source 1580 of the second converter leg 1470 may be decoupled from the AC bus 1500. Moreover, the second voltage source 1580 may be coupled to the negative DC terminal 1530 of the DC bus 1490. Once the second voltage source 1580 is coupled to the negative DC terminal 1530, the second converter leg 1470 is configured to provide the positive voltage to the AC bus 1500.

The operation of a second converter leg such as the second converter leg 30 of FIG. 1 during the three stages of transition is described hereinabove. It may be noted that the first and third converter legs 20, 40 of FIG. 1 may also be operated in a manner that is similar to the operation of the second corresponding leg described with respect to FIGS. 10-12 based on a position of corresponding phase in an AC cycle. Moreover, as described with respect to FIGS. 5-10, it may be noted that the first voltage source and the second voltage source in each of the first converter leg, the second converter leg and the third converter leg may be controlled independently for charging and discharging.

FIG. 13 is a diagrammatical representation of one embodiment of a power converter 1600 depicting a direct current (DC) fault condition in the power converter 1600, according to aspects of the present disclosure. The power converter 1600 may include a first converter leg 1610, a second converter leg 1620 and a third converter leg 1630. Moreover, the first converter leg 1610, the second converter leg 1620 and the third converter leg 1630 may be coupled to a DC bus 1640 and an AC bus 1650. The DC bus 1640 may further include a positive DC terminal 1660 and a negative DC terminal 1670. Also, the first converter leg 1610 may include a first voltage source 1680 and a second voltage source 1690. Moreover, the second converter leg 1620 may include a first voltage source 1700 and a second voltage source 1710. Similarly, the third converter leg 1630 may include a first voltage source 1720 and a second voltage source 1730. The first voltage source 1680 of the first converter leg 1610 may be operatively coupled to the AC bus 1650 and the second voltage source 1690 of the first converter leg 1610 may be operatively coupled to the negative DC terminal 1670. Furthermore, the first voltage source 1700 of the second converter leg 1620 may be operatively coupled to the positive DC terminal 1660 and the second voltage source 1710 of the second converter leg 1620 may be operatively coupled to the AC bus 1650. Moreover, the first voltage source 1720 of the third converter leg 1630 may be operatively coupled to the positive DC terminal 1660 and the second voltage source 1730 of the third converter leg 1630 may be operatively coupled to the AC bus 1650.

During a DC fault condition such as a DC short circuit, the positive DC terminal 1660 and the negative DC terminal 1670 may be shorted with each other. Therefore, a DC fault current 1740 may appear in the DC bus 1640. In accordance with aspects of the present disclosure, the DC fault current 1740 may be minimized by controlling the second voltage source 1690 of the first converter leg 1610, the first voltage source 1700 of the second converter leg 1620 and the first voltage source 1720 of the third converter leg 1630 to provide zero voltage. Additionally, the DC fault current 1740 may be minimized by controlling the first voltage source 1680 of the first converter leg 1610, the second voltage source 1710 of the second converter leg 1620 and the second voltage source 1730 of the third converter leg 1630 to provide zero AC current.

As previously noted, the voltage sources coupled to the AC bus 1650 may be controlled independently of the voltage sources coupled to the DC bus 1640. Therefore, a zero DC voltage may be achieved by bypassing the second voltage source 1690 of the first converter leg 1610, the first voltage source 1700 of the second converter leg 1620 and the first voltage source 1720 of the third converter leg 1630. The second voltage source 1690 of the first converter leg 1610, the first voltage source 1700 of the second converter leg 1620 and the first voltage source 1720 of the third converter leg 1630 may be bypassed due to the DC fault condition where the positive DC terminal 1660 and the negative DC terminal 1670 are directly coupled with each other in a short circuit condition.

Moreover, the first voltage source 1680 of the first converter leg 1610, the second voltage source 1710 of the second converter leg 1620 and the second voltage source 1730 of the third converter leg 1630 may be controlled to provide the zero alternating current. It may be noted that the power converter 1600 may be configured to continue to operate without being shut down upon achieving a zero DC voltage and a zero AC current in the power converter 1600. In particular, the power converter 1600 may be configured to continue operating using a circulation current (see FIG. 10) that is generated by independently controlling the second voltage source 1690 of the first converter leg 1610, the first voltage source 1700 of the second converter leg 1620 and the first voltage source 1720 of the third converter leg 1630. Also, during the DC fault condition, no power is transferred from the DC bus 1640 to the AC bus 1650.

FIG. 14 is a flow chart illustrating an exemplary method 1800 for power conversion configured to provide a direct current fault ride-through capability, according to aspects of the present disclosure. The method 1800 may be described in terms of FIGS. 1 to 13. The method 1800 includes selectively switching a plurality of switches in at least one converter leg of a power converter, as indicated by step 1810. In one embodiment, the plurality of switches may be selectively switched based on a position in an AC cycle.

Furthermore, at step 1820, a plurality of switching units in the converter leg of the power converter may be independently controlled. In one embodiment, the plurality of switching units in the converter leg may be controlled to provide a positive voltage or a negative voltage based on the position of a phase corresponding to that converter leg in the AC cycle. In another embodiment, the plurality of switching units may be controlled to operate an AC side and a DC side of the power converter independent of one another to provide the DC fault ride-through capability.

Moreover, energy storage elements in the respective switching units may be charged or discharged, as indicated by step 1830. In one embodiment, the plurality of switching units may be coupled to the DC side of the power converter for charging the energy storage elements of the respective switching units. In another embodiment, the plurality of switching units may be coupled to the AC side of the power converter for discharging the energy storage elements and providing a voltage to the AC side.

At step 1840, one or more line parameters of the plurality of switching units may be regulated such that the one or more line parameters attain zero values during a fault condition. In one embodiment, the one or more line parameters of the plurality of switching units coupled to the DC side and the AC side may be regulated such that the one or more line parameters have zero values. In another embodiment, the plurality of switching units coupled to the DC side may be bypassed to regulate the one or more parameters to attain zero values. In an exemplary embodiment, the one or more line parameters may include a current, a voltage, power, or combinations thereof.

Moreover, at least one converter leg of the power converter may be operated by controlling a direct current flowing through the converter leg to provide the DC fault ride-through capability, as indicated by step 1850. In one embodiment, the direct current flowing through the corresponding converter leg may be controlled to continue operations of that converter leg during the fault condition. Furthermore, the converter leg may be configured to continue operating in the same condition as during normal operating conditions without transferring power between the DC side and the AC side until the fault condition is eliminated.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

The exemplary embodiments of the power converter described hereinabove provide a DC fault ride-through capability to the power converter. The DC fault ride-through capability aids the power converter in continuing operations during a DC fault. The power converter is configured to continue its operations without shutting down, thereby reducing a cascading effect during the DC fault condition, which in turn minimizes a possibility of HVDC system collapse. The exemplary power converters also entail use of fewer electronic components, which in turn reduces cost and increases efficiency of the power converter. The use of fewer electronic components also reduces complexity of the power converter.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power converter, comprising:
one or more converter legs, wherein each converter leg comprises:
a first string comprising a plurality of switches coupled to each other in series; and
a second string operatively coupled to the first string at a first node and a second node in a parallel configuration via at least one inductor, wherein the second string comprises a plurality of switching units, wherein a second string of one converter leg of the one or more converter legs is operatively coupled to second strings corresponding to other converter legs in the one or more converter legs, wherein each of the plurality of switching units comprises a plurality of switching elements and an energy storage element,
and wherein the power converter is configured to provide a direct current fault ride-through capability.

2. The power converter of claim 1, wherein the power converter comprises a three phase power converter.

3. The power converter of claim 2, wherein the three phase power converter comprises three converter legs corresponding to each phase of a three phase system.

4. The power converter of claim 1, wherein the one or more converter legs are coupled to each other in a parallel configuration.

5. The power converter of claim 1, wherein the plurality of switches comprises partially controllable semiconductor switches, fully controllable semiconductor switches, or a combination thereof.

6. The power converter of claim 1, wherein the plurality of switching units comprises a half bridge configuration, full bridge configuration, or a combination thereof.

7. The power converter of claim 1, further comprising a controller configured to:
selectively switch the plurality of switches in at least one converter leg of the one or more converter legs;
independently control the plurality of switching units in the at least one converter leg of the power converter;
charge or discharge energy storage elements in respective switching units of the plurality of switching units;
regulate one or more line parameters of the plurality of switching units such that the one or more line parameters attain zero values during a fault condition; and
operate the at least one converter leg by controlling a direct current within the converter leg to provide the direct current fault ride-through capability.

8. The power converter of claim 1, wherein the plurality of switching elements comprises an insulated gate bipolar transistor, a metal oxide semiconductor field effect transistor, a field effect transistor, a gate turn-off thyristor, an insulated gate commutated thyristor, an injection enhanced gate transistor, a silicon carbide based switch, a gallium nitride based switch, a gallium arsenide based switch, or combinations thereof.

9. The power converter of claim 1, wherein each first string of the one or more converter legs is operatively coupled to an alternating current bus at respective first string nodes.

10. A method for power conversion, comprising:
selectively switching a plurality of switches in at least one converter leg of a power converter, wherein the at least one converter leg comprises:
  a first string comprising a plurality of switches coupled to each other in series;
  a second string operatively coupled to the first string at a first node and a second node in a parallel configuration via at least one inductor, wherein the second string comprises a plurality of switching units, wherein a second string of the at least one converter leg is operatively coupled to second strings corresponding to other converter legs in power converter, and wherein each of the plurality of switching units comprises a plurality of switching elements and an energy storage element;
independently controlling a plurality of switching units in the at least one converter leg of the power converter;
charging or discharging energy storage elements in respective switching units of the plurality of switching;
regulating one or more line parameters of the plurality of switching units such that the one or more line parameters attain zero values during a fault condition; and
operating the at least one converter leg by controlling a direct current within the converter leg to provide a direct current fault ride-through capability.

11. The method of claim 10, wherein selectively switching the plurality of switches comprises selectively switching the plurality of switches based on a position of a phase in an alternating current cycle.

12. The method of claim 11, wherein independently controlling the plurality of switching units in the at least one converter leg comprises independently controlling each of the plurality of switching units in the at least one converter leg to provide a positive voltage or a negative voltage based on the position of the phase corresponding to the at least one converter leg in the alternating current cycle.

13. The method of claim 10, wherein charging or discharging the energy storage elements in the respective switching units comprises coupling the plurality of switching units to a direct current side of the power converter.

14. The method of claim 10, wherein charging or discharging the energy storage elements in the respective switching units comprises coupling the plurality of switching units to an alternating current side of the power converter to provide an alternating current voltage.

15. The method of claim 10, wherein independently controlling the plurality of switching units comprises independently operating an alternating current side and a direct current side of the power converter to provide direct current fault ride-through capability.

16. The method of claim 10, wherein regulating the one or more line parameters of the plurality of switching units comprises regulating the one or more line parameters of the plurality of switching units coupled to a direct current side of the power converter and regulating the one or more line parameters of the plurality of switching units operatively coupled to an alternating current side of the power converter.

17. The method of claim 16, wherein regulating the one or more line parameters of the plurality of switching units coupled to the direct current side comprises bypassing one or more of the plurality of switching units coupled to the direct current side.

18. The method of claim 10, wherein regulating the one or more line parameters comprises regulating a current, a voltage, power, or combinations thereof.

19. The method of claim 10, wherein operating the at least one converter leg by controlling the direct current comprises operating the at least one converter leg without transferring power between a direct current side and an alternating current side.

* * * * *